United States Patent [19]

Yasuki et al.

[11] Patent Number: 4,870,482
[45] Date of Patent: Sep. 26, 1989

[54] MOTION-ADAPTIVE TYPE SIGNAL SEPARATOR WITH DATA COMPANDING FUNCTION

[75] Inventors: Seijiro Yasuki, Yokohama; Kiyoyuki Kawai, Yokosuka, both of Japan

[73] Assignee: Kabushiki Kaisha Toshiba, Kawasaki, Japan

[21] Appl. No.: 171,735

[22] Filed: Mar. 21, 1988

[30] Foreign Application Priority Data

Mar. 30, 1987 [JP] Japan .................................. 62-74162

[51] Int. Cl.$^4$ .............................................. H04N 9/78
[52] U.S. Cl. .......................................... 358/31; 358/36
[58] Field of Search ..................... 358/105, 31, 36, 37, 358/135

[56] References Cited

U.S. PATENT DOCUMENTS

| | | | |
|---|---|---|---|
| 4,598,309 | 7/1986 | Casey | 358/31 X |
| 4,694,331 | 9/1987 | Law et al. | 358/31 |
| 4,739,390 | 4/1988 | Achiha et al. | 358/31 X |
| 4,754,322 | 6/1988 | Okuda et al. | 358/31 |

OTHER PUBLICATIONS

Achiha et al, "A Motion-Adaptive High-Definition Converter for NTSC Color TV Signals", SMPTE Journal, May 1984, pp. 470–476.
Kawai et al, "IDTV Receiver", IEEE Tranactions on Consumer Electronics, vol. CE-33, No. 3, Aug. 1987, pp. 181–191.
Proceeding of the IEEE, vol. 69, No. 3, Mar. 1981.
1984 National Meeting of Television Institute (GAKKAI) A paper entitled "Motion Detection for the High-–Definition Conversion of Composite Color Signals".

Primary Examiner—James J. Groody
Assistant Examiner—Victor R. Kostak
Attorney, Agent, or Firm—Cushman, Darby & Cushman

[57] ABSTRACT

A data bandwidth compressor receives an input digital video signal which includes first and second signal components, compresses the data bandwidth of the signal, and outputs a resultant signal. A line difference detector includes a line memory for storing the output signal from the data bandwidth compressor and detects a difference signal between adjacent lines. A frame difference detector includes a frame memory for storing the output signal from the data bandwidth compressor and detects a difference signal between adjacent frames. A motion detector receives the output signal from the data bandwidth compressor and detects an image motion signal included in the output signal. A first separator separates and outputs the first signal component by changing the mixing ratio of the line and frame difference signals, in accordance with the image motion signal. A data interpolator receives the first signal component from the first separator and outputs the first signal component, which is interpolated to obtain an original data bandwidth. A second separator receives the input digital video signal and the first signal component from the data interpolator, and separates and outputs the second signal component.

11 Claims, 8 Drawing Sheets

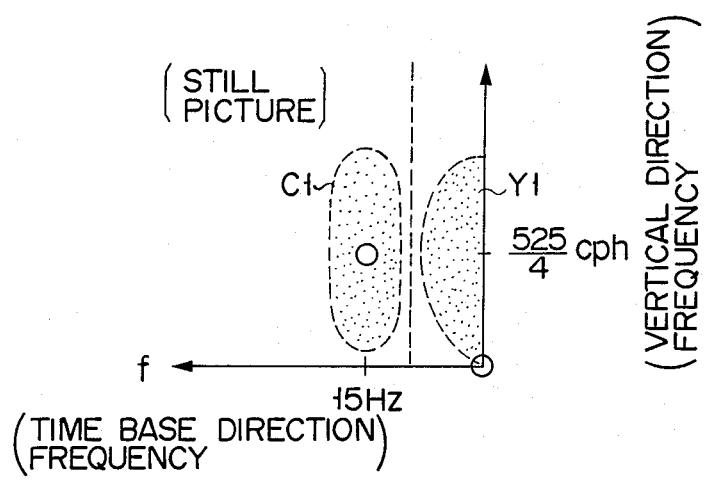
F I G. 3A
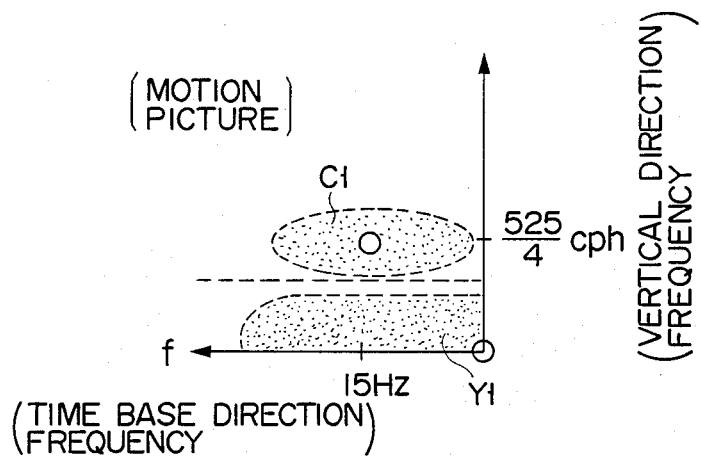
F I G. 3B

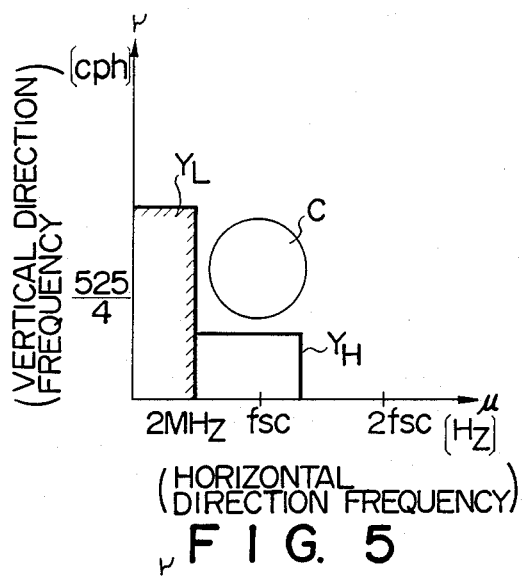
F I G. 5
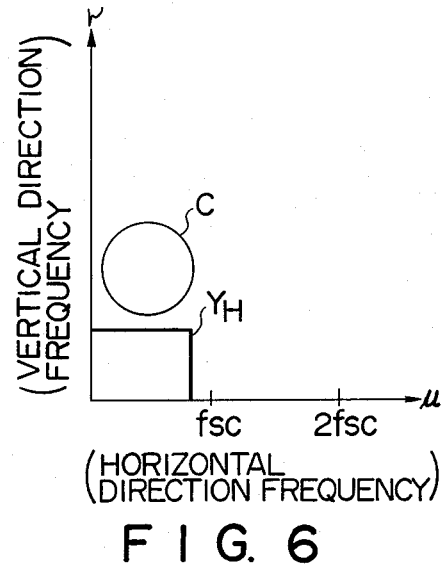
F I G. 6
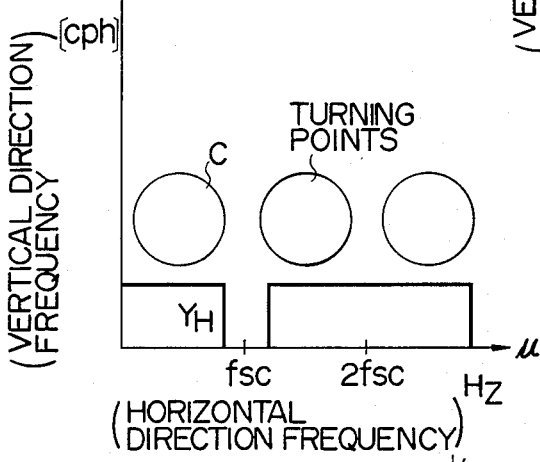
F I G. 7
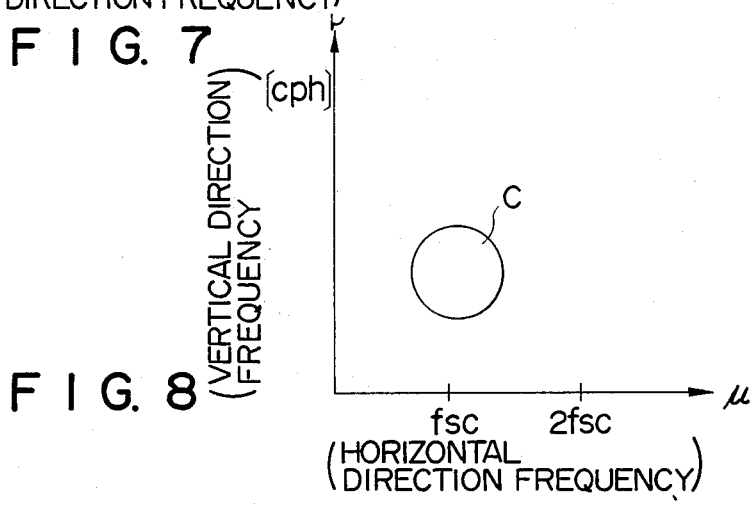
F I G. 8

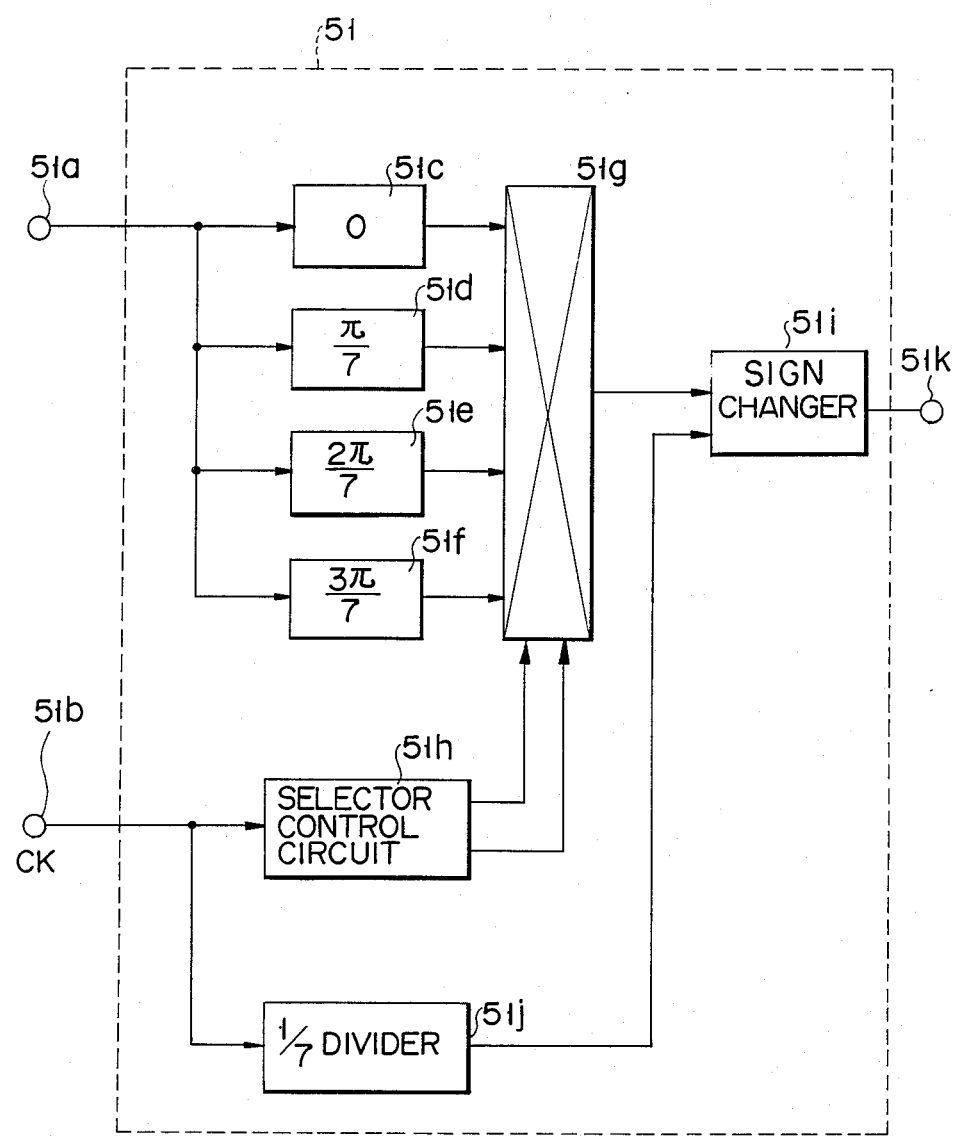
F I G. 10

MOTION-ADAPTIVE TYPE SIGNAL SEPARATOR WITH DATA COMPANDING FUNCTION

BACKGROUND OF THE INVENTION

1. Field of the Invention

This invention relates to a motion adaptive type signal separator with a data companding function and, more particularly, to a digital video signal Y/C separator for Y/C-separating a composite video signal formed by frequency-multiplexing a plurality of signals, e.g., a composite TV signal of the frequency-multiplexed luminance signal (Y) and chrominance signals (C), by utilizing digital signal processing.

2. Description of the Related Art

Existing color TV broadcasting systems use a composite TV signal which is obtained by multiplexing the color subcarrier modulated by a chrominance difference signal with the luminance signal. For this reason, a receiver must perform luminance/chrominance separation (to be referred to as Y/C separation hereinafter). However, if signal separation is performed in a simple manner, this may result in image quality degradation such as cross-color or dot crawl, resulting from incomplete signal separation. Recently, a comb filter having excellent separation characteristics has been introduced for the purpose of improved Y/C separation. However, even when such a comb filter is used, there is no noticeable improvement in image resolution image in a helical direction.

With the aim of eliminating the above drawbacks, a so-called motion adaptive type Y/C separator has recently been developed for use in a digital TV system in which signal processing is performed digitally upon detection of a video signal, in order to obtain an image of particularly high quality. The motion adaptive type signal separator changes the parameters of its filter characteristics by detecting the motion data of a picture. This separator, which is described in SMPTE Journal, 1984, May, pp. 470–476, performs Y/C separation with respect to both a still picture and a motion picture, on the basis of operations between frames, using a frame memory, and on the basis of operations between lines, respectively.

However, such a motion-adaptive type signal separator requires a frame memory having a large capacity in order to perform Y/C separation with respect to a still picture. This requirement inevitably results in an increase in the size of the circuit, which poses problems in terms of unit cost.

Summary of the Invention

It is therefore an object of the present invention to provide a new and improved motion-adaptive type signal separator having a data companding function which can decrease the cost by reducing the capacity of a frame memory.

It is another object of the present invention to provide a motion adaptive type signal separator which can not only reduce the capacity of a frame memory but also minimize an increase in sizes of other elements.

According to one aspect of the present invention, there is provided a motion adaptive type signal separator comprising:

data bandwidth compressing means for receiving an input digital video signal including first and second signal components, compressing a data bandwidth of the signal, and outputting a resultant signal;

line difference detecting means including line memory means for storing the output signal from the data bandwidth compressing means, for detecting a difference signal between adjacent lines;

frame difference detecting means including a frame memory means for storing the output signal from the data bandwidth compressing means, for detecting a difference signal between adjacent frames;

motion detecting means for receiving the output signal from the data bandwidth compressing means and detecting an image motion signal included in the output signal;

first separating means, coupled to the line difference detecting means, the frame difference detecting means, and the motion detecting means, for separating and outputting the first signal component by changing a mixing ratio of the line and frame difference signals in accordance with the image motion signal;

data interpolating means for receiving the first signal component from the first separating means and outputting the first signal component which is interpolated to obtain the original data bandwidth; and second separating means for receiving the input digital video signal and the first signal component from the data interpolating means and separating and outputting the second signal component.

BRIEF DESCRIPTION OF THE DRAWINGS

These and other objects and features of the present invention can be understood through the following embodiments by reference to the accompanying drawings, in which:

FIGS. 3A and 3B are graphs of signal distribution for explaining an operation of the circuit in FIG. 2;

FIGS. 5 to 8 are graphs of signal distribution for explaining an operation of the circuit in FIG. 4;

FIG. 10 is a circuit diagram showing a frequency shifter in FIG. 9 in detail.

DETAILED DESCRIPTION OF THE PREFERRED EMBODIMENT

A digital system of a digital TV set, to which an embodiment of the present invention is applied, will be generally described below with reference to FIG. 1.

Figure 1:
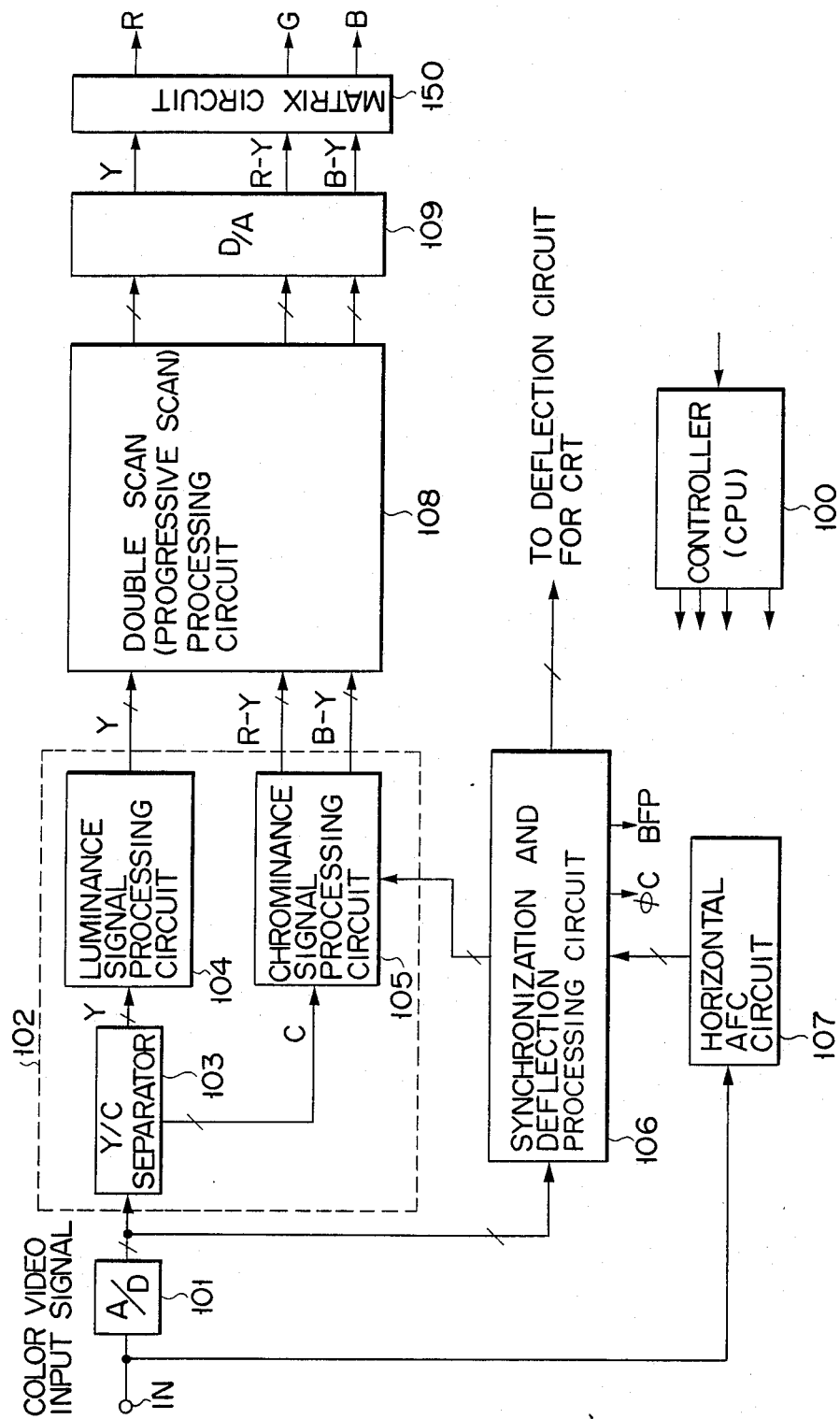
FIG. 1 is a block diagram schematically showing a digital TV system to which the present invention is applied.

As shown in FIG. 1, an analog video signal supplied to input terminal IN is converted into a digital video signal by A/D converter 101. A/D converter 101 samples an analog video signal using clock signal 4 fsc (fsc: color subcarrier frequency) synchronized with a burst signal and outputs a digital video signal having a quantized value of 8 bits. Y/C separator 103 separates this digital signal into the Y (luminance signal) component and the C (chrominance signal) components. Y/C separator 103 aims to obtain the Y and C signals free from cross-color interference, which is caused when the luminance signal is mixed in the chrominance signals. For this purpose, a motion adaptive type Y/C separator is employed.

The Y signal output from Y/C separator 103 is processed by luminance signal processing circuit 104, wherein horizontal/vertical edge emphasis and Y nonlinear processing are mainly performed. For the purpose of edge emphasis, luminance signal processing circuit 104 includes a digital filter for extracting an edge from the Y signal and a pipelined multiplier having e.g., 8×4, or 8×3 bits for adjusting a gain of the extracted signal and adding the resultant signal to the original Y signal. In addition, in order to provide the Y nonlinear characteristic to the Y signal, luminance signal processing circuit 104 includes a pipelined multiplier having, e.g., 8×4 bits and an adder.

The C signal output from Y/C separator 103 is processed by chrominance signal processing circuit 105 and subjected to bandpass filter processing, matrix color demodulation processing, ACC (Automatic Color Control) processing, and color killer processing. For this purpose, chrominance signal processing circuit 105 includes a digital bandpass filter for removing an unnecessary Y component from the C signal, and a pipelined multiplier having, e.g., 9×9 bits and serving as a matrix color demodulation circuit for adjusting hue, saturation, and the like of the C signal upon removal of the unnecessary Y component so as to obtain color difference signals R-Y and B-Y. In addition, chrominance signal processing circuit 105 includes a color killer circuit, a matrix circuit, and an ACC circuit which cooperates with a multiplier to reliably perform color reproduction.

Y/C separator 103, luminance signal processing circuit 104, and chrominance signal processing circuit 105 are formed into an IC as color demodulation (video signal) processing circuit 102.

The digital video signal from A/D converter 101 is also supplied to synchronization and deflection processing circuit 106, which is formed into an IC, because the color demodulation in chrominance signal processing circuit 105 need be controlled in synchronism with a phase of clock 4 fsc. For this purpose, synchronization and deflection processing circuit 106 includes a phase locked loop (PLL) for generating color sync signal φc and burst gate signal BFP. In addition, in order to function as a CRT deflection circuit, circuit 106 includes a vertical synchronization circuit for obtaining a vertical sync detection signal from the digital video signal, and a horizontal synchronization circuit for obtaining a horizontal drive pulse on the basis of an output from horizontal AFC circuit 107.

In order to obtain high image quality, luminance signal Y, and color difference signals R-Y and B-Y from color demodulation circuit 102, which is formed into an IC, are supplied to double scan (progressive scan) processing circuit 108, which is formed into an IC by a plurality of chips including field and line memories. As is well known, scan processing circuit 108 doubles the scanning lines in an image (interlaced scanning → noninterlaced scanning) to improve a vertical resolution and minimize unsteady flickering (so-called line flicker) on the screen. In the case of the progressive scan processing circuit, as is well known, three-dimensional processing is performed using horizontal components, vertical components, and time as follows. In a still picture area, interpolated scanning lines are formed using picture elements of the immediately preceding field, whereas in a motion picture area, interpolated scanning lines are formed using picture elements of adjacent scanning lines of one field, thereby finely performing motion detecting processing of each picture element.

After the scan processing for high image quality is performed, signals Y, R-Y, and B-Y are respectively converted by D/A converter 109 into analog signals and then converted by matrix circuit 150 into the R, G, and B signals.

Note that reference numeral 100 in FIG. 1 denotes a controller (CPU) for supplying clocks and timing signals required for processing in each circuit described above.

The present invention relates to an improvement in a case wherein a motion adaptive type signal separator is applied as Y/C separator 103 included in integrated color demodulation circuit 102 of the digital TV system described above.

Prior to the description of the embodiment according to the present invention, a conventional motion adaptive type signal separator known by the above literature will be described below.

Figure 2:
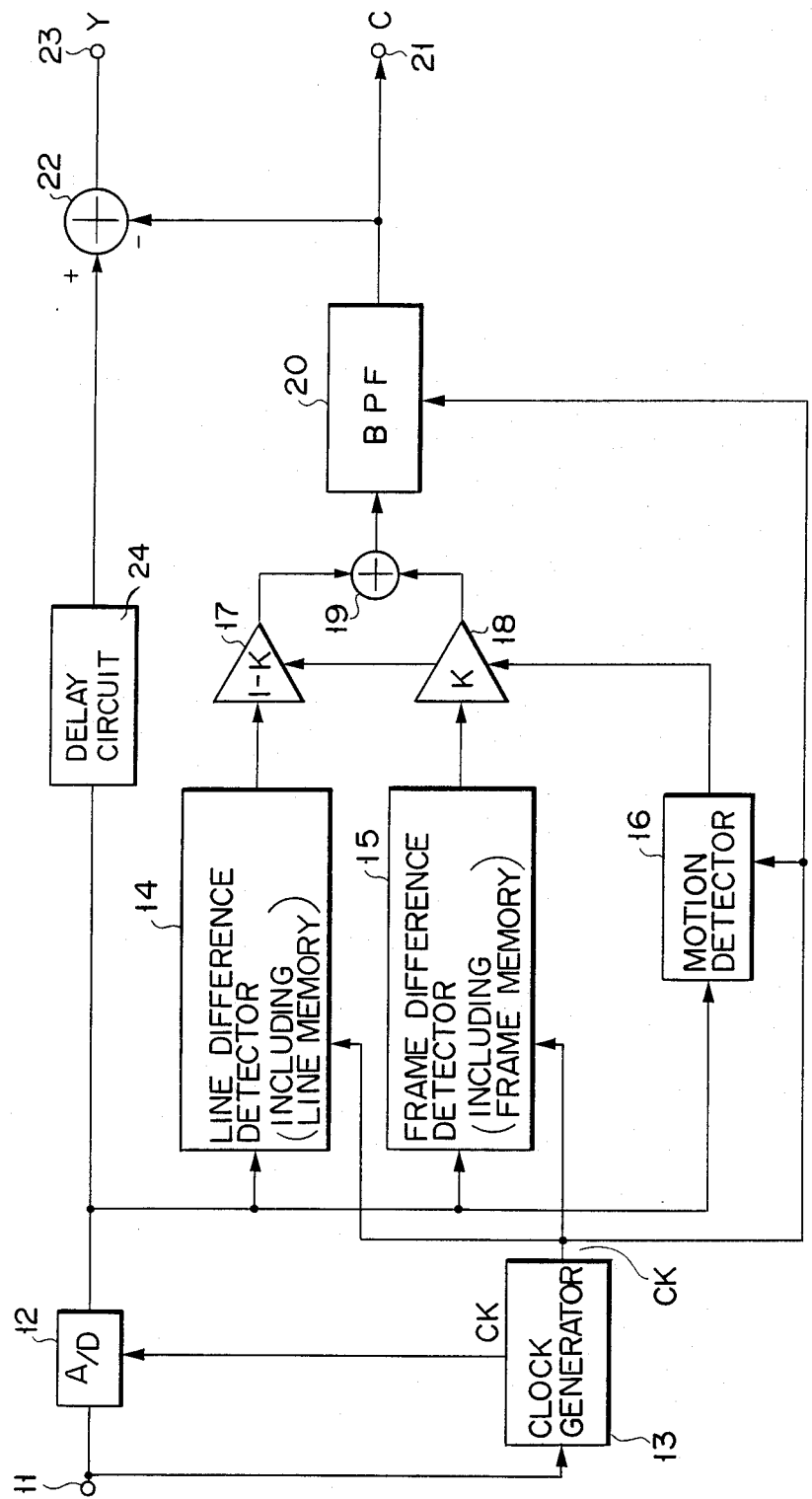
FIG. 2 is a circuit diagram of a conventional motion adaptive type signal separator.

Referring to FIG. 2, an analog video signal serving as a composite TV signal supplied to input terminal 11 is input to analog/digital converter (to be referred to as an A/D converter hereinafter) 12. A/D converter 12 converts the input analog signal into a digital signal using a clock generated by clock generator 13. Clock generator 13 generates clocks CK whose phase is synchronized with the burst signal superposed on the input signal, and supplies clocks CK to A/D converter 12, line difference detector 14 including a line memory, frame difference detector 15 including a frame memory, motion detector 16, and horizontal bandpass filter 20. An output signal from A/D converter 12 is supplied to subtracter 22 through delay circuit 24, and supplied to line difference detector 14, frame difference detector 15, and motion detector 16. Outputs from line and frame difference detectors 14 and 15 are supplied to adder 19 through gain controllers 17 and 18, and are synthesized. This synthesized output appears at output terminal 21 as chrominance signal C and at the same time supplied to subtracter 22 through horizontal bandpass filter 20. Accordingly, luminance signal Y is separated by subtracter 22 and supplied to output terminal 23.

In this case, motion detector 16 detects a motion signal corresponding to the motion of a picture in the composite TV signal, and generates a control signal in accordance with this detection output, thereby controlling the gains of gain controllers 17 and 18. More specifically, when a still picture is to be processed, chrominance signal component C1 can be separated by an operation for obtaining the difference between signals of adjacent frames because chrominance and luminance signal components Y1 and C1 of a corresponding signal do not expand much along the time base direction (frequency f), as shown in FIG. 3A. In contrast to the above case, when a motion picture is processed, the signal components expand along the time base direction (frequency f) and do not expand much in the vertical direction (frequency v). For this reason, in this case, chrominance signal component C1 can be separated by an operation for obtaining the difference between signals of adjacent lines.

By utilizing this principle, the circuit in FIG. 2 increases the gain of gain controller 18 and decreases the gain of gain controller 17 when a still picture is processed, whereas gain control is performed in the opposite manner when a motion picture is processed, thereby performing Y/C separation.

However, this circuit cannot be realized unless a frame memory having a large capacity for storing 1-frame data is used in frame detector 15.

In order to solve this problem, the present inventor proposes a motion adaptive type signal Y/C separator which can reduce the capacity of a memory by shifting the frequency and performing bandwidth compression using a sub-sample circuit after an input composite TV signal is separated by a high-pass filter.

Figure 4:
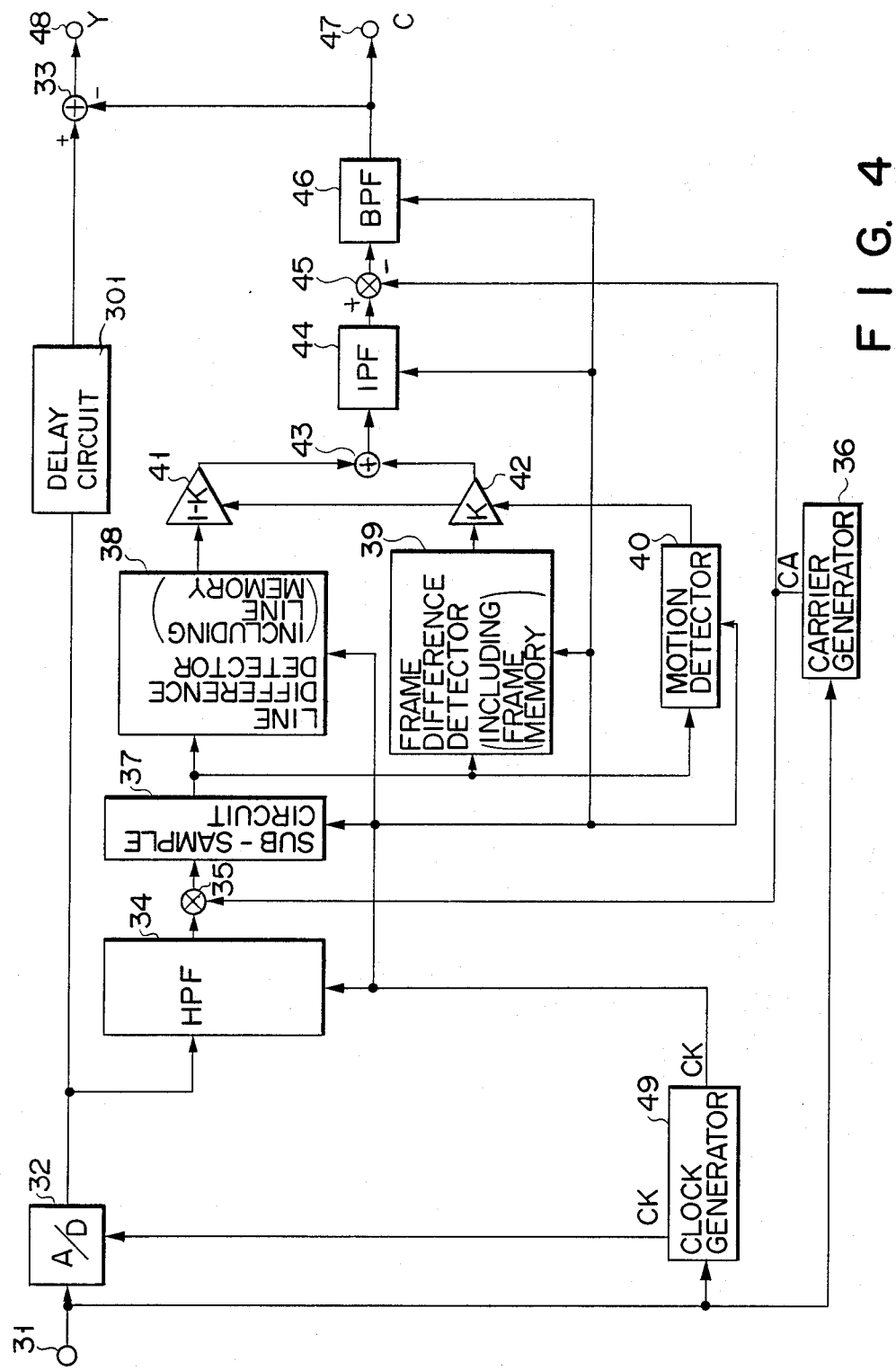
FIG. 4 is a circuit diagram of a motion adaptive type signal separator according to a first embodiment of the present invention.

FIG. 4 shows such a motion adaptive Y/C separator according to a first embodiment of the present invention. Referring to FIG. 4, a composite TV signal is supplied to input terminal 31 as an analog video signal. The input composite TV signal is sampled by A/D converter 32 at a predetermined sampling frequency, converted into a digital signal, and then supplied to subtracter 33 through delay circuit 301, and supplied to high-pass filter 34. The cutoff frequency of high-pass filter 34 is set at 2 MHz. As a result, a composite TV signal in which the luminance and chrominance signals having frequencies of 2 MHz or more are mixed together is obtained from high-pass filter 34.

An output signal from high-pass filter 34 is supplied to multiplier 35 and frequency-shifted by carrier signal CA supplied from carrier generator 36. In this case, the frequency of carrier signal CA is an integer multiple of horizontal sync frequency $f_H$ and set at a value close to 2 MHz.

An output from multiplier 35 is supplied to subsample circuit 37 to be sub-sampled. An output from sub-sample circuit 37 is supplied to line difference detector 38 including a line memory, frame difference detector 39 including a frame memory, and motion detector 40, in a manner similar to the circuit previously shown in FIG. 2. Output signals from line and frame difference detectors 38 and 39 are mixed with each other by a mixing circuit consisting of gain controllers 41 and 42, and adder 43. As a result, chrominance signal C is separated. In this case, the mixing ratio is determined in accordance with an amount of motion of an image detected by motion detector 40.

Separated chrominance signal C is supplied to interpolation filter (IPF) 44 and converted into chrominance signal C having a sub-sampling frequency before it is supplied to sub-sample circuit 37. An output signal from interpolation filter 44 is supplied to subtracter 45, detected at carrier signal CA equal to carrier signal CA used in multiplier 35, and then is supplied to bandpass filter (BPF) 46 in the horizontal direction (frequency $\mu$). The above-described interpolation filter (IPF) is described in, e.g., PROCEEDING OF THE IEEE, Vol. 69, No. 3, 1981, March, pp. 300-312.

An output signal from bandpass filter 46 is supplied to output terminal 48 and subtracter 33 as an separated output of chrominance signal C. Subtracter 33 produces luminance signal Y by subtracting chrominance signal C from the output signal supplied from A/D converter 32 and outputs the resultant signal to output terminal 48.

Note that reference numeral 49 denotes a clock generator for generating clock CK for driving each circuit after A/D converter 32 in synchronism with the burst signal included in an input signal.

The above operation will be described with reference to the frequency area between horizontal and vertical frequencies $\mu$ and $\nu$ in FIGS. 5 to 8. FIG. 5 shows the spectrum of a composite TV signal to be input. Highpass filter 34 filters off low-frequency component $Y_L$ of luminance signal Y indicated by slashes in FIG. 5 and outputs high-frequency components $Y_H$ having 2 MHz or more of chrominance and luminance signals C and Y. When an output signal from high-pass filter 34 is detected by carrier signal CA, it produces the spectrum as shown in FIG. 6.

Sub-sample circuit 37 converts the input signal having the spectrum as shown in FIG. 6 into data having a low sampling frequency such that turning is not caused, as shown in FIG. 7. In this case, assume that the frequency of the input signal supplied to sub-sample circuit 37 is 4 fsc and sub-sample circuit 37 converts it into 2 fsc. The capacities of the line and frame memories in line and frame difference detectors 38 and 39 can be reduced to ½.

Subsequently, chrominance signal C is separated while the sampling frequency is kept low. The frequency of chrominance signal C is returned by interpolation filter (IPF) 44 to its original sampling frequency. Chrominance signal C is detected by carrier signal CA equal to carrier signal CA in the preceding step, and then filtered by bandpass filter 46 so that chrominance signal C is returned to its original frequency position, as shown in FIG. 8. Luminance signal Y is obtained by subtracting chrominance signal C having the spectrum shown in FIG. 8 from the composite TV signal having the spectrum shown in FIG. 5.

As described above, the Y/C separator according to the first embodiment in FIG. 4 separates chrominance signal C from the composite TV signal while the band width of the composite TV signal is compressed by subsampling. Therefore, in the Y/C separator in FIG. 4, the capacity of the frame memory included in frame difference detector 39 can be reduced by the amount of band width compression, thereby decreasing the size of the circuit.

However, in the arrangement shown in FIG. 4, multiplier 35 and carrier generator 36 are required for frequency shift. In this case, a large number of gates and registers must be used as hardware for constituting multiplier 35. In addition, in order to constitute carrier generator 36, an oscillator and a circuit for synchronizing the oscillator with horizontal sync signal included in a composite TV signal are required. Therefore, the Y/C separator in FIG. 4 requiring such multiplier 35 and carrier generator 36 cannot be sufficiently benefited by the effect obtained by reducing the capacity of the frame memory, i.e., a decrease in circuit size.

As described above, although the Y/C separator according to the first embodiment in FIG. 4 can reduce the capacity of the frame memory, it cannot be sufficiently benefited by the effect accompanied with a decrease in capacity of the frame memory, i.e., a decrease in circuit size because multiplier 35 and carrier generator 36 are required.

Therefore, according to a second embodiment of the present invention, there is provided a Y/C separator which can be sufficiently benefited by the effect derived from a decrease in capacity of a frame memory, i.e., a decrease in circuit size.

A general description of the second embodiment will be made below. In order to achieve the above object, according to the second embodiment of the present invention, in the arrangement wherein an input composite TV signal is A/D-converted and output, i.e., a sampled output is frequency-shifted, and then a predetermined signal is separated from the compressed composite TV signal with a compressed bandwidth by sub-sampling, the sampling frequency is set to be 4 fsc (fsc is a color subcarrier frequency), and the frequency shift is performed by coefficient multiplication processing with respect to the sampling output using phase data of 0, $\pi/7$, $2\pi/7$, $3\pi/7$, and $4\pi/7$, a process of selecting each coefficient multiplication output in a predetermined order in accordance with the 4-fsc clock, and a process of inverting the polarity of a selected output in accordance with 4/7-fsc signal.

According to the above arrangement, the coefficient multiplication outputs are selected in the order of 0, $\pi/7$, $2\pi/7$, $3\pi/7$, $3\pi/7$, $2\pi/7$, $\pi/7$, and 0, and the polarities thereof are inverted in accordance with the 4/7-fsc signal, thereby satisfying a predetermined phase relationship as follow: 0, $\pi/7$, $2\pi/7$, $3\pi/7$, $-3\pi/7$, $-2\pi/7$, $-\pi/7$, and 0.

Figure 11:
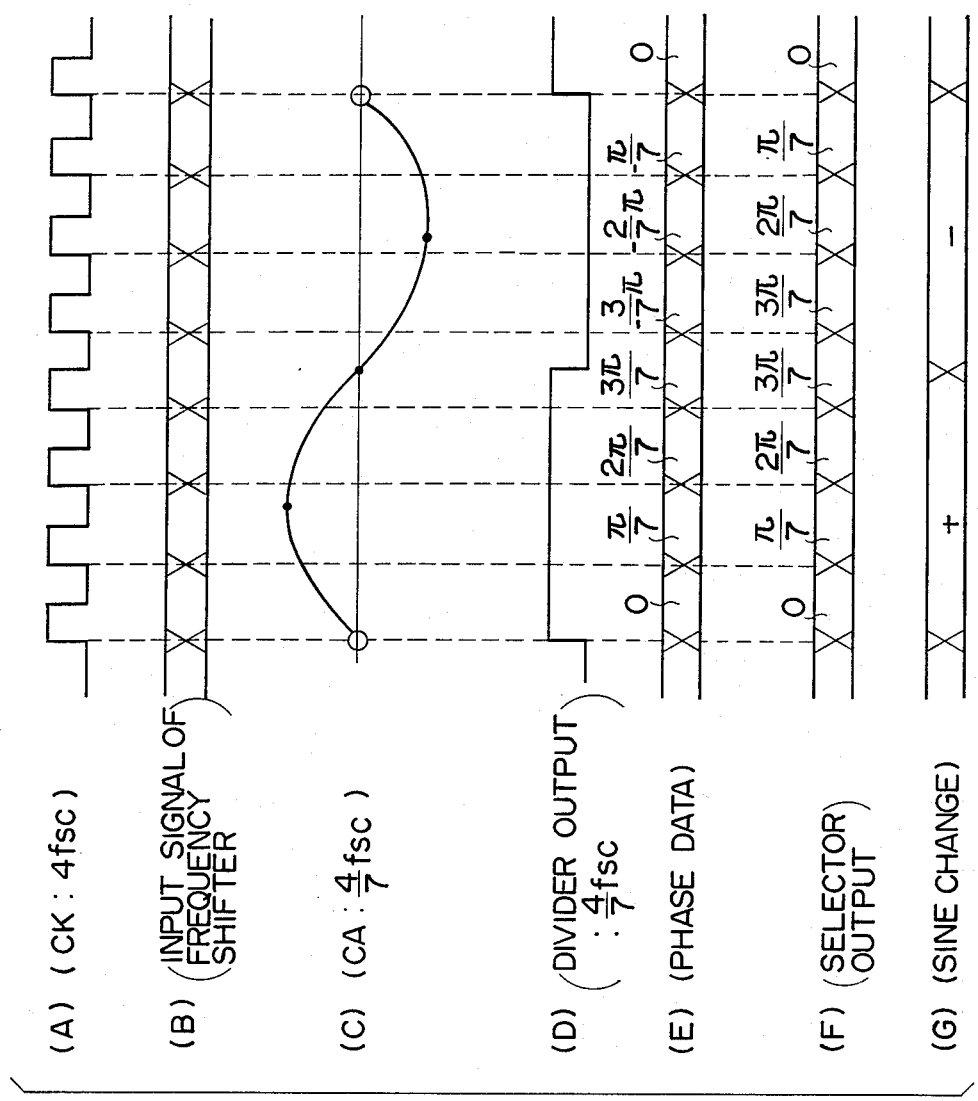
FIG. 11A to 11G are timing charts for explaining an operation of the circuit in FIG. 10.

The second embodiment of the present invention will be described below with reference to FIGS. 9 to 11.

Figure 9:
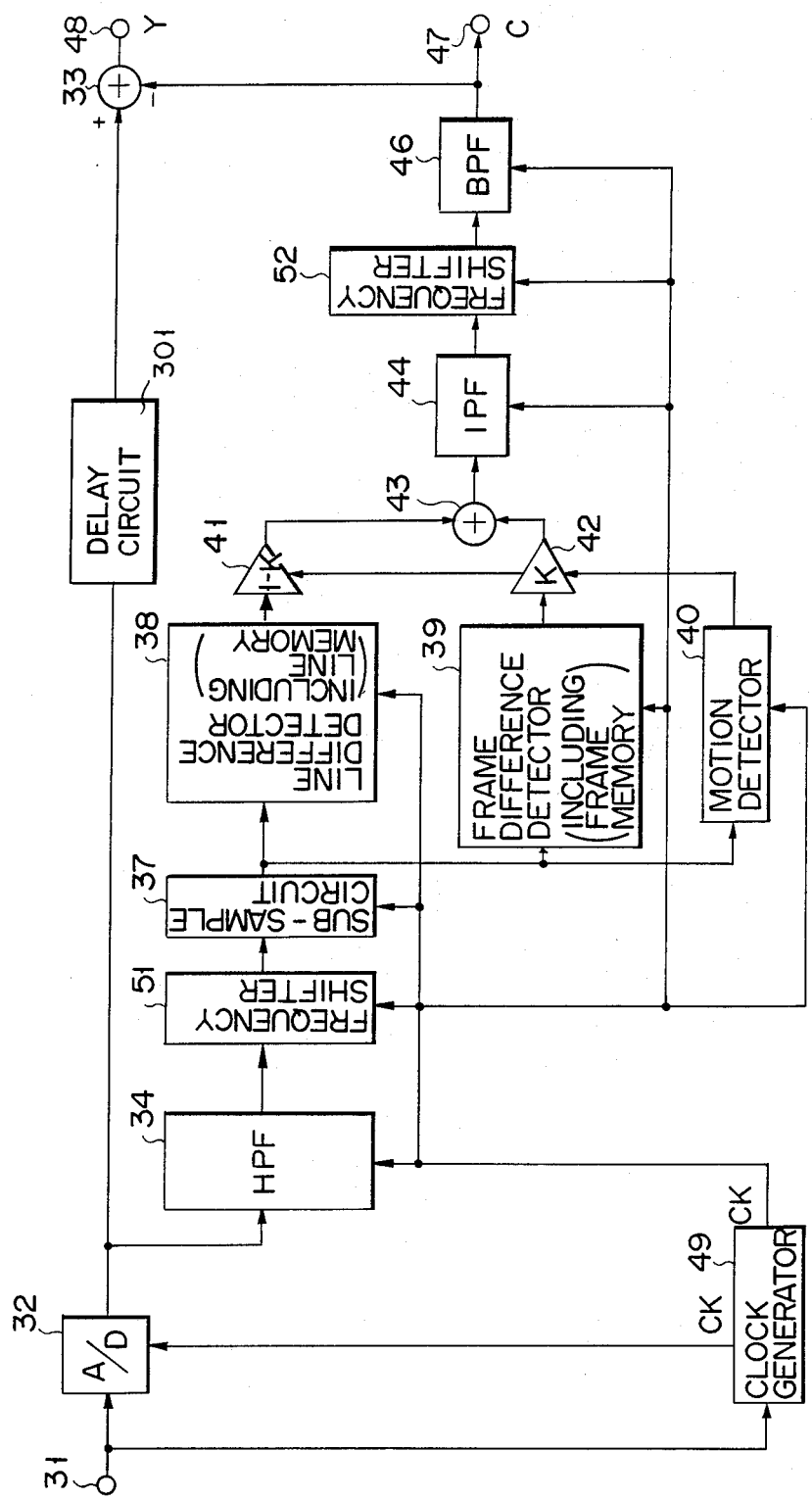
FIG. 9 is a circuit diagram showing a second embodiment according to the present invention.

FIG. 9 is a clock diagram showing an arrangement of the second embodiment of the present invention. The same reference numerals in FIG. 9 denote the same parts as in FIG. 4.

Referring to FIG. 9, reference numerals 51 and 52 denote frequency shifters constituting a main feature of the second embodiment according to the present invention. More specifically, the Y/C separator in FIG. 9 is different from that in FIG. 4 in that multipliers 35 and 45, and carrier 36 are replaced with frequency shifters 51 and 52.

Each of frequency shifters 51 and 52 has an arrangement as shown in FIG. 10. The arrangement of frequency shifter 51 is shown in FIG. 10 as a representative. The arrangement and operation of frequency shifter 51 in FIG. 10 will be described below.

In this embodiment, carrier frequency fc for frequency shift is set as:

fc = 130 $f_H$ ($f_H$: horizontal sync frequency). In this case, fsC = 455 $f_H$/2 then, fc = 4fsc/7 ≈ 2.045 MHz Therefore, as described with reference to FIG. 4, carrier frequency fc is an integer multiple of $f_H$ and has a value close to 2 MHz. In addition, if the frequency of system clock CK output from clock generator 49 is 4 fsc, carrier frequency fc becomes 1/7 the clock frequency.

Referring to FIG. 10, an output signal from high-pass filter 34 in FIG. 9 is supplied to input terminal 51a. Clock CK output from clock generator 49 is supplied to input terminal 51b. The signal input to input terminal 51a is supplied to ROMs 51c to 51f respectively having phase data of 0, $\pi/7$, $2\pi/7$, and $3\pi/7$, i.e., a value of sine wave, and multiplied by corresponding coefficients.

Output signals from ROMs 51c to 51f are supplied to selector 51g. In synchronism with clock CK, selector 519 selects the output signals from ROMs 51c to 51f in a predetermined order in accordance with a control signal output from selector control circuit 51h. A signal selected by selector 51g is supplied to sign changer 51i. Sign changer 51i inverts the sign (positive or negative) of the input signal in accordance with a divider output from 1/7 divider 51j for dividing clock CK supplied to input terminal 51b into seven components, and supplies the resultant signal to output terminal 51k. The signal supplied to output terminal 51k is output to sub-sample circuit 37 shown in FIG. 9.

The above operation will be described more in detail with reference to FIGS. 11A to 11G. FIG. 11A shows clock CK having frequency 4 fsc supplied to input terminal 51b. FIG. 11B shows data input to frequency shifter 51 synchronized with clock CK. FIG. 11C shows a carrier for frequency shift. FIG. 11D shows a 1/7 divider output supplied from 1/7 divider.

When the input signals to frequency shifter 51 and the carrier are multiplied with each other, multiplication outputs having phases of 0, $\pi/7$, $2\pi/7$, $3\pi/7$, $-3\pi/7$, $-2\pi/7$, and $-\pi/7$ are obtained, as shown in FIG. 11E. Therefore, if selector 51g in FIG. 10 sequentially selects the ROM outputs having coefficients of 0, $\pi/7$, $2\pi/7$, $3\pi/7$, $3\pi/7$, $2\pi/7$, $\pi/7$, and 0 shown in FIG. 11F, and inverts the polarities of the selected outputs in accordance with the 1/7 divider output, the phase relationship shown in FIG. 11E can be satisfied.

Thus, according to the second embodiment of the present invention, selector 51g, selector control circuit 51h, and sign changer 51i are operated in a manner shown in FIG. 11G, thereby performing frequency shift. Therefore, according to the second embodiment, frequency shift can be performed without using the multipliers and carrier generator in the first embodiment, thereby sufficiently obtaining the effect derived from a decrease in capacity of the frame memory included in frame difference detector 39, i.e., a decrease in circuit size.

The second embodiment of the present invention has been described above, in the case using coefficient ROMs. However, coefficient ROMs may be changed into means by shifting one or more bits and means by adding. It is assumed that $\pi/7 = 0.449 \approx 0.5 - 0.0625$, $2\pi/7 = 0.878 \approx 1 - 0.125$, $3\pi/7 = 1.346 \approx 1 + 0.25 + 0.0625$. Accordingly, 0.5 can be maked by shifting of one-bit, 0.25 can be maked by shifting of two-bits, and 0.0625 can be maked by shifting of four-bit. Then, coefficients of $\pi/7$, $2\pi/7$ and $3\pi/7$ can be maked by adding or subtracting values obtained from the shifting means.

As has been described above, according to the second embodiment of the present invention, there is provided a motion adaptive type signal separator in which the multipliers and the carrier generator are not required, and the effect of reduction in circuit size derived from a decrease in capacity of the frame memory can be sufficiently obtained.

What is claimed is:

1. A motion-adaptive type signal separator comprising:
   data bandwidth-compressing means for receiving an input digital video signal including first and second signal components, compressing a data bandwidth of the signal, and outputting a resultant signal;
   line difference-detecting means including line memory means for storing the output signal from said data bandwidth-compressing means, for detecting a difference signal between adjacent lines;
   frame difference-detecting means including a frame memory means for storing the output signal from said data bandwidth-compressing means, for detecting a difference signal between adjacent frames;
   motion-detecting means for receiving the output signal from said data bandwidth-compressing means and detecting an image motion signal included in the output signal;
   first separating means, coupled to said line difference-detecting means, said frame difference-detecting means, and said motion-detecting means, for separating and outputting the first signal component by changing a mixing ratio of the line and frame difference signals, in accordance with the image motion signal;

data-interpolating means for receiving the first signal component from said first separating means and outputting the first signal component, which is interpolated to obtain an original data bandwidth;

second separating means for receiving the input digital video signal and the first signal from said data-interpolating means and separating and outputting the second signal component;

first frequency-shift means, for receiving the input digital video signal, shifting the signal to a frequency not higher than a predetermined frequency, and outputting a resultant signal to said data bandwidth-compressing means; and second frequency-shift means, for receiving the interpolated first signal component from said data-interpolated means, shifting the first signal component to an original frequency bandwidth thereof, and outputting a resultant signal component.

2. A separator according to claim 1, wherein said first frequency-shift means includes high-pass filter means for receiving the input digital video signal and outputting a signal of a high-frequency component higher than a first predetermined frequency, and first multiplier means, for multiplying an output signal from said high-pass filter means and a carrier signal corresponding to the input digital video signal, and said second frequency-shift means includes second multiplier means, for multiplying the interpolated first signal component and the carrier signal, and bandpass filter means for outputting the output signal from said second multiplier means, in accordance with the original frequency bandwidth.

3. A separator according to claim 1, wherein said data-interpolating means includes an interpolation filter.

4. A separator according to claim 2, wherein the first predetermined frequency is about 2 MHz.

5. A separator according to claim 2, wherein the frequency of the carrier signal is an integer multiple of a horizontal sync frequency of the input digital video signal and is close to 2 MHz.

6. A motion-adaptive type signal separator comprising:

sampling means for receiving a composite TV signal composed of frequency-multiplexed first and second signals, and sampling the composite TV signal;

first frequency-shift means, for receiving a sampling output from said sampling means and shifting a frequency of the sampling output;

sub-sampling means for receiving a frequency-shifted output from said first frequency-shift means and sub-sampling the frequency-shifted output;

frame time direction filter operating means for receiving a sub-sampled output from said sub-sampling means and performing a filter operation for the sub-sampled output in a frame time direction;

vertical direction filter operating means for receiving the sub-sampled output from said sub-sampling means and performing a filter operation for the sub-sampled output in a vertical direction;

first signal-separating means, for separating the first signal by changing a mixing ratio of operation outputs from said frame time direction filter operating means and said vertical direction filter operating means, in accordance with an amount of motion of an image indicated by an image motion signal included in the composite TV signal;

interpolation filter means for returning a sampling frequency of the first signal output from said first signal-separating means to an original frequency of the signal before sub-sampling is performed by said sub-sampling means;

second frequency-shift means, for receiving an output from said interpolation filter means and shifting a frequency of the output; and second signal-separating means, for separating the second signal by synthesizing a frequency-shifted output, from said second frequency-shift means, with the sampling output from said sampling means, wherein said sampling means is designed so as to sample the composite TV signal, by using a clock having a frequency of 4 times a color subcarrier frequency and synchronized with the composite TV signal, and said first and second frequency-shift means include four coefficient-multiplying means for respectively coefficient-multiplying the sampling output from said sampling means, using phase data of 0, $\pi/7$, $2\pi/7$, and $3\pi/7$, selecting means for sequentially selecting coefficient multiplication outputs from said four coefficient-multiplying means in a predetermined order, in accordance with the clock, and inverting means for inverting a polarity of each selected output from said selecting means, in accordance with a signal having a frequency of 4/7 the color subcarrier frequency and synchronized with the composite TV signal.

7. A separator according to claim 5, further comprising:

high-pass filter means for receiving a sampling output from said sampling means and supplying a signal of a high-frequency component, having a frequency higher than a predetermined frequency, to said first frequency-shift means; and bandpass filter means for receiving a frequency-shifted output from said second frequency-signal means and outputting an output as the first signal, in accordance with a frequency bandwidth of the sampling output from said sampling means.

8. A separator according to claim 7, wherein the predetermined frequency is about 2 MHz.

9. A separator according to claim 6, further comprising clock generating means for receiving the input analog video signal and generating the clock in synchronism with a burst signal of the signal.

10. A motion-adaptive type signal separator comprising:

data bandwidth compressing means for receiving an input digital video signal including first and second signal components, compressing a data bandwidth of the signal, and outputting a resultant signal;

line difference-detecting means including line memory means for storing the output signal from said data bandwidth-compressing means, for detecting a difference signal between adjacent lines;

frame difference-detecting means including a frame memory means for storing the output signal from said data bandwidth-compressing means, for detecting a difference signal between adjacent frames;

motion-detecting means for receiving the output signal from said data bandwidth-compressing means and detecting an image motion signal included in the output signal;

separating means, coupled to said line difference-detecting means, said frame difference-detecting means, and said motion-detecting means, for separating and outputting the first signal component by changing a mixing ratio of the line and frame difference signals, in accordance with the image motion signal;

data interpolating means for receiving the first signal component from said separating means and outputting the first signal component which is interpolated, to obtain an original data bandwidth;

first frequency-shift means, for receiving the input digital video signal, shifting the signal to a frequency not higher than a predetermined frequency, and outputting a resultant signal to said data bandwidth-compressing means; and second frequency-shift means, for receiving the interpolated first signal component from said data-interpolating means, shifting the first signal component to an original frequency bandwidth thereof, and outputting a resultant signal component.

11. A motion-adaptive type signal separator comprising:

data bandwidth compressing means for receiving an input digital video signal including first and second signal components, comprising a data bandwidth of the signal, and outputting a resultant signal, said data bandwidth-compressing means including a sub-sample circuit;

line difference-detecting means including line memory means for storing the output signal from said data bandwidth-compressing means, for detecting a difference signal between adjacent lines;

frame difference-detecting means including a frame memory means for storing the output signal from said data bandwidth-compressing means, for detecting a difference signal between adjacent frames;

motion-detecting means for receiving the output signal from said data bandwidth-compressing means and detecting an image motion signal included in the output signal;

first separating means, coupled to said line difference-detecting means, said frame difference-detecting means, and said motion-detecting means, for separating and outputting the first signal component by changing a mixing ratio of the line and frame difference signals, in accordance with the image motion signal;

data-interpolating means for receiving the first signal component from said first separating means and outputting the first signal component, which is interpolated to obtain an original data bandwidth; and second separating means for receiving the input digital video signal and the first signal from said data-interpolating means and separating and outputting the second signal component.

* * * * *